United States Patent [19]

Brunsch et al.

[11] Patent Number: 4,512,847
[45] Date of Patent: Apr. 23, 1985

[54] METHOD OF MEASURING THE THICKNESS OF THE REMOVED LAYER IN SUBTRACTIVE WORKPIECE PROCESSING

[75] Inventors: Arwed Brunsch, Stuttgart; Wolf-Dieter Ruh; Gerhard Trippel, both of Sindelfingen, all of Fed. Rep. of Germany

[73] Assignee: International Business Machines Corporation, Armonk, N.Y.

[21] Appl. No.: 539,761

[22] Filed: Oct. 5, 1983

[30] Foreign Application Priority Data

Oct. 14, 1982 [EP] European Pat. Off. ........ 82109514.8

[51] Int. Cl.³ ................ H01L 21/306; B44C 1/22; C03C 15/00; C03C 25/06
[52] U.S. Cl. ................ 156/626; 156/643; 156/646; 156/345; 204/192 E; 204/298
[58] Field of Search ............... 156/626, 627, 643, 646, 156/345; 204/192 EC, 192 E, 298; 356/381, 388, 357; 29/574, 583

[56] References Cited

U.S. PATENT DOCUMENTS 4,367,044 1/1983 Booth et al. ................ 156/626 X

FOREIGN PATENT DOCUMENTS 54-55377 5/1979 Japan ................ 156/626
56-645031 4/1981 Japan ................ 156/626

OTHER PUBLICATIONS

IBM Technical Disclosure Bulletin, vol. 24, No. 9, Feb. 1982, Thin Film Monitor for In Situ Measuring of Silicon Etch Rates, J. Greschner et al., pp. 4804–4805.

Primary Examiner—William A. Powell
Attorney, Agent, or Firm—Otto Schmid, Jr.

[57] ABSTRACT

A test sample (7) of the same material, or with the same structure as the workpiece (5) exposed to subtractive processing is simultaneously exposed to such processing and consists of a wedge (10) with the angle $\alpha$ covered by two covering plates (11) which are complementary to its two surfaces (14). By measuring the distance $x_1$ between the thus formed gaps (15), and by comparing it with the original distance $x_0$, thickness z of the respectively removed layer can be determined from the equation $$z = \frac{x_1 - x_0}{2 \, tg \, \alpha/2}$$

5 Claims, 5 Drawing Figures

METHOD OF MEASURING THE THICKNESS OF THE REMOVED LAYER IN SUBTRACTIVE WORKPIECE PROCESSING

BACKGROUND OF THE INVENTION

1. Field of the Invention

This invention relates to a method for subtractive workpiece processing and more particularly to a method for controlling the subtractive material processing so that maintaining a given tolerance of material thickness to be removed is ensured.

2. Description of the Prior Art

Subtractive workpiece processing frequently involves the removing of a predetermined layer thickness with maximum precision, and the terminating of the process in time, particularly in connection with etching and other kinds of subtractive processing of electrical components, in particular semiconductor and ceramic components, to whose precise form and dimensional stability very high demands are made. These methods can involve processes like sputter etching, reactive ion etching, or plasma etching in connection with techniques like photolithography, but also cutting, grinding and other methods by which material is removed from a workpiece.

For some materials, as e.g. sintered ceramic substances the etching speed is extremely low, e.g. in the order of 200 Å/min. corresponding to 20 nm/min. so that for a structural depth of for instance 12 $\mu$m etch times of approximately 10 hours are required. In the case of sputter etching, the etch rates are determined by various sputter parameters, as gas pressure, gas composition, gas flow, etc. Specific variations of these parameters complicate the maintaining of the very narrow admissible tolerances, which in the above given example can be approximately $\pm 1$ $\mu$m, so that even if the calculated etch time is strictly observed there is a considerable risk of the tolerances being exceeded, and of the workpiece becoming useless. The consequences are particularly serious in those cases where in one single etching process a high number of workpieces are processed simultaneously. This kind of process frequently involves several hundreds of parts which are simultaneously exposed to an etching process.

Although it is possible to add a supplementary etching process if the predetermined minimum depth of the layer to be removed has not yet been reached, the etching rates vary considerably e.g. at the beginning of a sputtering process until the process parameters have reached stability. It is therefore complicated also in this particular case precisely to maintain the desired etching depth.

Consequently, it has to be made sure that in subtractive processes the desired removal depth can be maintained as precisely as possible, which in view of the above specified problems is possible only with a reliable continuous supervision of the respective depth reached, and by a corresponding control of the process. This control should be effected in situ, e.g. during the actual process, without the workpiece being detached, and if possible without the process being interrupted.

It is known to monitor the etching rate of semiconductor elements by continuously observing the thickness of the element, or the thickness decrease during subtracting, by means of infrared radiation whose rays reflected by the two surfaces are made to interfere (IBM Technical Disclosure Bulletin, Vol. 20, No. 6, pp. 2268/2269). The measuring is executed by an infrared detector, and the thickness decrease can be calculated taking into consideration the known refraction index of the material. This process can be executed in situ, but it requires a complex structure and furthermore a relatively long processing period.

Another method for determining the depth of workpieces, e.g. thin film circuit elements with different layers of material, consists in analyzing the respective crater form as a function of the subtractive processing, e.g. sputtering (IBM Technical Disclosure Bulletin, Vol. 21, No. 2, p. 672). However, workpiece layers of different hardness have to be considered here.

In another method of measuring a recess in a workpiece a microscope is used which is directed at an angle of 45° onto the vertical wall of the recess. If the workpiece is horizontally displayed relative to the microscope, or vice versa from a microscope target in the recess wall to the next target, the corresponding vertical distance corresponds to the displacement distance since both distances correspond to the two legs of an isosceles triangle. However, this method described in IBM Technical Disclosure Bulletin, Vol. 18, No. 7, p. 2069 requires a recess surface that is precisely vertical, i.e. that extends at right angles to the surface of the workpiece, as well as the means for microscopic observation.

SUMMARY OF THE INVENTION

It is the object of the invention to provide a method of measuring the removed layer thickness in subtractive workpiece processing which can be implemented reliably and very easily without affecting the process execution. This object has been achieved with the method specified in the patent claim. The method as disclosed by the invention permits the continuous measuring in situ of the respective removed layer thickness, and consequently the control of the process duration to such an effect that maintaining the given tolerances of the layer thickness to be removed is ensured.

According to the invention, the surface of the test sample is removed exactly like the workpiece material to be etched, the surface of the measured wedge increasing to the same extent as the layer removed from the test sample.

The method as disclosed by the invention can be implemented quite easily by observing through the microscope the distance between the gaps, and by a comparison with the original distance measured at the beginning of the process the depth reached by processing can at any time be calculated on the basis of the wedge angle. In a particularly effective use of the present method the gap distance is automatically controlled by means of a corresponding optical measuring device whose output signals are applied to a computer storing the conversion formula as well as the original value of the gap distance. Owing to a continuous control of the gap distance and the comparison of the calculated result with an equally stored desired value for the depth of the layer to be removed the process can take place fully automatically and does not require any specific observation.

BRIEF DESCRIPTION OF THE DRAWINGS

In the following, the method as disclosed by the invention will be described in detail by means of an embodiment with reference to the drawings. The drawings show the following.

DESCRIPTION OF THE PREFERRED EMBODIMENT

Figure 1:
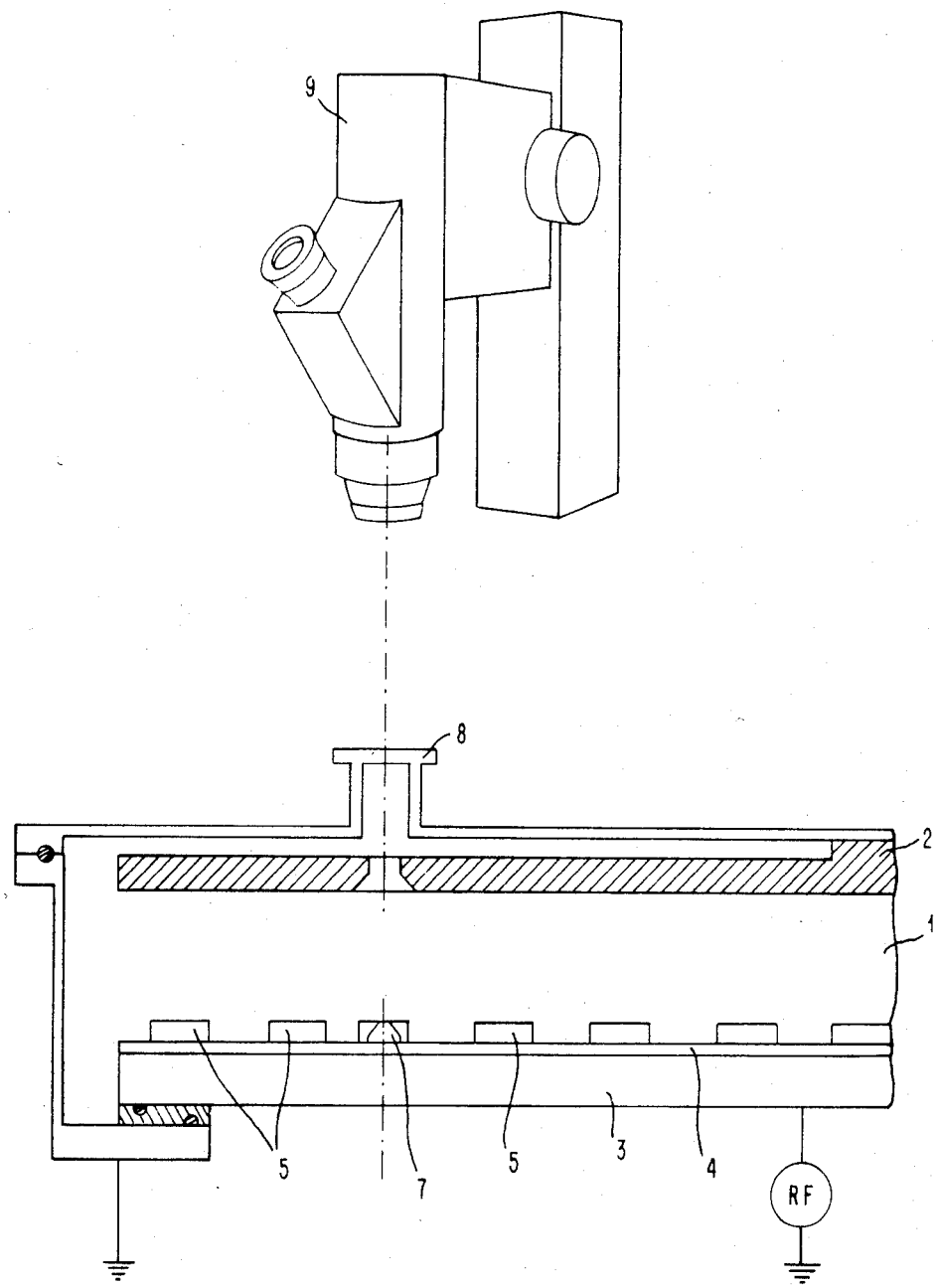
FIG. 1 is a schematic representation of an arrangement for measuring the removed layer thickness (etching depth) in the sputter etching of a plurality of workpieces.
Figure 2:
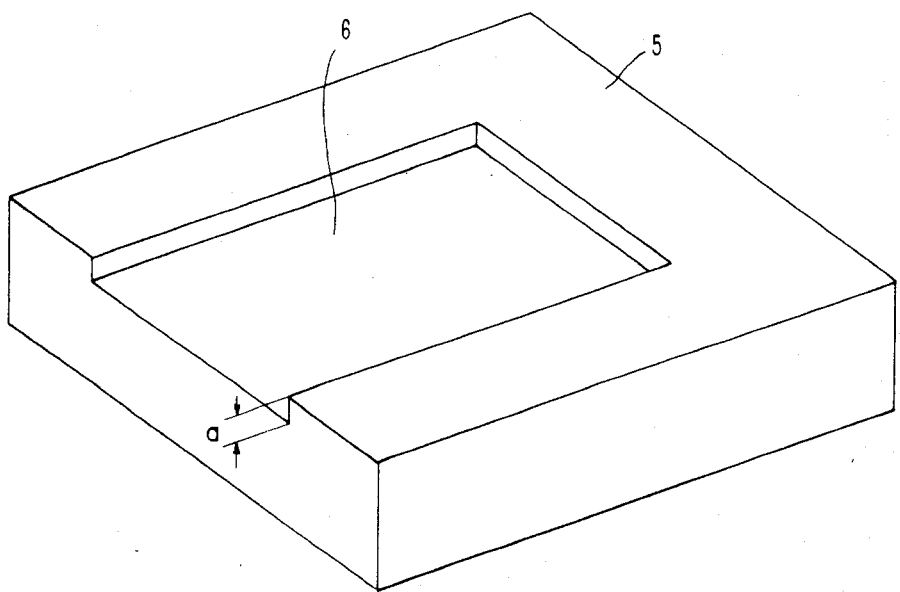
FIG. 2 is an enlarged perspective view of a workpiece of the kind depicted in FIG. 1.

The arrangement of FIG. 1 shows a sputter chamber 1 with an anode 2 and a cathode 3 with a superimposed workpiece carrier plate 4. Placed onto workpiece carrier plate 4, a number of workpieces 5 are provided of ceramic sintered material which are exposed to a sputter etching process. FIG. 2 depicts a completed workpiece 5 after the etching process, where a recess 6 has been made in the central zone of the surface up to the edge of an outer side. The other surface regions of workpiece 5 are coated by means of one of the known methods in such a manner that the etching cannot become effective in the remaining regions.

For the depth of recess 6, a desired value a with a small tolerance is given, e.g. $a = 12 \mu m \pm 0.5 \mu m$. For observing the respective etching depth, there is arranged in sputter chamber 1 on workpiece carrier plate 4 between workpieces 5 a test sample 7 made of the same ceramic sintered substance as workpieces 5, which is thus exposed to the etching process in the same manner as workpieces 5. Through a viewport 8, test sample 7 can be observed by means of a microscope 9.

Figure 3:
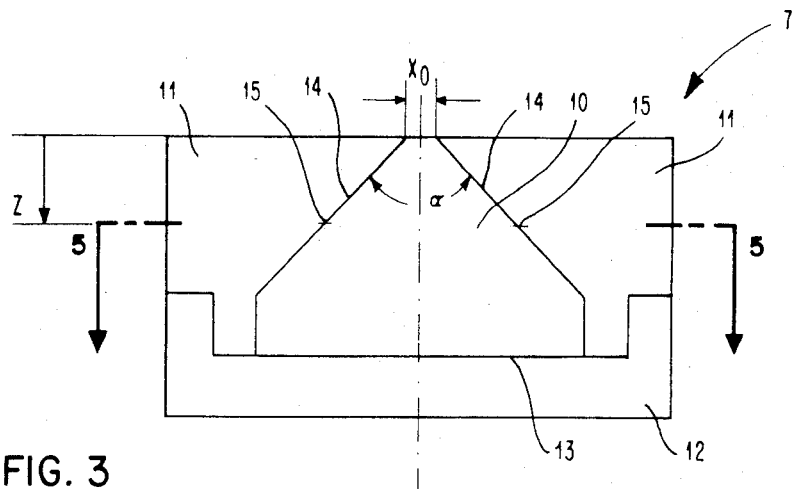
FIG. 3 is an enlarged schematic representation of a test sample as used in the arrangement according to FIG. 1.

According to FIG. 3, test sample 7 consists of a wedge 10, two covering pieces 11, and a U-shaped clamp 12. Wedge 10 rests with its base 13 on clamp 12, and the two wedge surfaces 14 enclose an upward-directed wedge angle $\alpha$. Wedge surfaces 14 are covered on both sides by one respective covering plate 11 and aligned complementarily relative to wedge angle $\alpha$, consequently, their covering surface extends at an angle of $90° - \alpha/2$ against the horizontal. Clamp 12 holds together wedge 10 and covering plates 11. The contact planes between wedge surfaces 14 and the adjacent surfaces of covering plates 11 will in the following be referred to as gap 15. As pointed out above, wedge 10 as well as covering plates 11 consist of the same material as workpieces 5.

Figure 4:
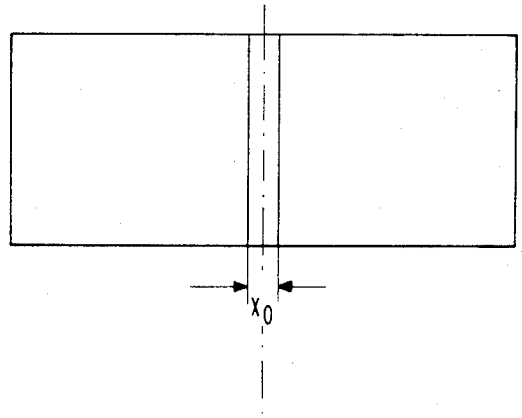
FIG. 4 is a plan view of the test sample in accordance with FIG. 3.
Figure 5:
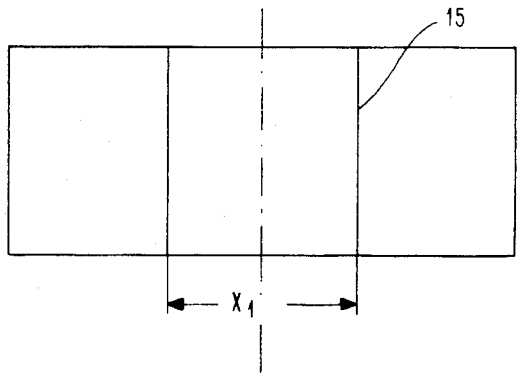
FIG. 5 is a plan view of the test sample in accordance with FIG. 3 after the etching depth characterized by line 5—5 has been reached.

In the following, the method of measuring the etching depth of workpieces 5 will be described with reference to FIGS. 1 and 3 to 5. Before beginning the etching process, the distance $x_O$ between gaps 15 is measured which is visible between wedge surfaces 14 of wedge 10 and covering plates 11 on the surface of test pattern 7 (FIGS. 3 and 4). During etching, material is removed from the surface of test sample 7 exactly as from the uncoated regions of workpieces 5. The removal of the material proportionally increases the wedge surface so that the distance x between gaps 15 on the surface, i.e. the width of the wedge surface is increased accordingly. Between the width difference $x_1 - x_0$ and the etching depth $z_1$ there is the following relation.

$$z_1 = \frac{x_1 - x_0}{2 \, tg \, \alpha/2}$$

where
$x_0$ = the width before etching between gaps 15
$x_1$ = the width of the wedge surface at time $t_1$, and
$\alpha$ = the wedge angle
measured value $x_1$ the etching process is to be terminated.

$$x_1 = x_0 + 2z_1 \cdot tg\alpha/2$$

By observing test sample 7 in microscope 9 it will thus be possible to fix the time when the desired etching depth z has been reached and the process is to be terminated.

Test sample 7 can be observed with respect to distance x between the two gaps 15 either by an operator through a microscope 9, or automatically. In the latter case, the corresponding values for the desired etching depth z, the wedge angle $\alpha$, and width $x_0$ are stored in an associated computer which continuously receives signals representing the respective widths of the wedge surface. If the desired etching depth z has been reached, sputter chamber 1 receives a signal from the computer terminating the etching process. A simplified method consists in reading value $x_1$ for the wedge surface width which corresponds to the desired etching depth into the storage of the computer, and in comparing continuously with this constant value the values for x found by microscope 9.

This automatic implementation of the above described measuring process is of advantage particularly in those cases where the etching process extends over a very long period, as e.g. with particularly hard materials, since in those cases the visual monitoring by an operator is particularly complex, and since furthermore there is the risk that due to carelessness the admissible tolerance for the etching gas is exceeded.

The sensitivity of the above described method can be influenced by selecting different wedge angles $\alpha$. With a given etching speed, the distance between gaps 15 increases with the size of $\alpha$, which in turn increases the reading precision.

If workpieces 5 do not consist of homogeneous material but comprise different layers the above described method can be applied in the same manner. In that case, test sample 7 is also made with a structure identical with that of workpieces 5 in that starting from the surface it contains the same layers with the same structure. Basically, it is possible to make test sample 7 consisting of wedge 10 and covering plates 11 out of one workpiece 5, e.g. by sawing. In this manner, it is most reliably guaranteed that the material or the material layers between workpieces 5 and test sample 7 coincide precisely.

If the subtractive process is not an etching process but a grinding or cutting method with machining mechanical processing of the workpieces the above described method is equally suitable. In that case, the starting width $x_0$ of the front end of the wedge is measured as soon as the processing tool has reached the surface of workpieces 5.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new, and desire to secure by Letters Patent is:

1. The method of measuring the removed layer thickness is subtractive workpiece processing, said method comprising the steps of:

processing the workpiece simultaneously with a test sample consisting of the same material as the workpiece, the test sample consisting of a wedge and two covering pieces complementary to the two lateral surfaces of the wedge and protecting the surfaces against the processing;

measuring, in the plane of the surface formed by the wedge point and the covering pieces and exposed to processing, the respective distance $x_1$ between the two gaps which appear between the lateral surfaces of the wedge and the adjacent protecting pieces; and determining the respectively removed layer thickness $z_1$ from the difference between the original distance $x_0$ and the measured distance $x_1$, taking into consideration the wedge angle $\alpha$.

2. The method of claim 1 wherein the measuring step is performed by an optical measuring device which produces ouput signal corresponding to the measured distance $x_1$.

3. The method of claim 2 wherein the measuring step is performed, in response to said output signals, by a computer storing the conversion formula $$z_1 = \frac{x_1 - x_0}{2 \tan \alpha/2}$$

and the original value of the gap distance $x_0$.

4. The method of claim 3 wherein said computer also stores a desired value of the removed layer thickness, comprising the additional step performed after the determining step of comparing the determined removed layer thickness with said desired value of the removed layer thickness and signalling, in response to an equal compare, that the desired etching depth has been reached and the process is to be terminated.

5. The method of measuring the removed layer thickness in subtractive workpiece processing, characterized in that a test sample consisting of the same material as the workpiece is processed simultaneously with the workpiece, the test sample consisting of a wedge and two covering pieces complementary to the two lateral surfaces of the wedge and protecting the surfaces against the processing, that in the plane of the surface formed by the wedge point and the covering pieces and exposed to processing, the respective distance between the two gaps is measured which appear between the lateral surfaces of the wedge and the adjacent protecting pieces, and that the respectively removed layer thickness is determined from the difference between the original distance and the measured distance, taking into consideration the wedge angle.

* * * * *